United States Patent [19]

Watters et al.

[11] Patent Number: 4,562,310

[45] Date of Patent: Dec. 31, 1985

[54] KEYBOARD SECURITY FOR A TELEPHONE ATTENDANT CONSOLE

[75] Inventors: James M. Watters; Donald E. Clement, both of Belleville, Canada

[73] Assignee: Northern Telecom Limited, Montreal, Canada

[21] Appl. No.: 594,931

[22] Filed: Mar. 29, 1984

[51] Int. Cl.[4] .............................................. H04M 1/66
[52] U.S. Cl. ........................... 179/100 R; 179/18 AD; 179/90 D
[58] Field of Search .......... 179/90 D, 18 AD, 18 BE, 179/18 DA, 27 D, 27 CB, 27 FF, 27 FG, 27 FH, 100 R, 100 D, 91 R, 93, 95, 96

[56] References Cited

U.S. PATENT DOCUMENTS

| | | | |
|---|---|---|---|
| 3,225,155 | 12/1965 | Duncan | 179/93 |
| 3,341,664 | 9/1967 | Leonard | 179/51 |
| 3,571,518 | 3/1971 | Chipman et al. | 179/27 |
| 3,851,111 | 11/1974 | Young | 179/51 R |
| 4,099,033 | 7/1978 | Murray | 179/90 D |
| 4,449,017 | 5/1984 | Burke et al. | 179/27 D |
| 4,453,042 | 6/1984 | Wolf et al. | 179/84 VF |
| 4,499,337 | 2/1985 | Elbaek | 179/27 D |

OTHER PUBLICATIONS

Carlsson et al., "Terminal Controlled Extension . . .", *Ericsson Review*, vol. 53, No. 1, pp. 30-37, 1976.
Willett, G., "The Operator's Console . . .", *Post Office Elec. Eng. Journal*, vol. 73, pp. 138-144, Oct. 1980.

*Primary Examiner*—Gene Z. Rubinson
*Assistant Examiner*—Elio DiVito
*Attorney, Agent, or Firm*—J. E. Moorhouse

[57] ABSTRACT

An attendant console for use with an electronic private automatic branch exchange (EPABX) includes a jack for removably connecting an attendant headset or handset to the console. A switch array in the console provides indications of attendant control action and logic circuitry connected to the switch array registers the indications. Gates are connected in series with the switch array for preventing registration of the indications in response to the attendant set being disconnected, such that control actions as may be indicated at the switch array while the attendant is away from the console are of no consequence.

3 Claims, 1 Drawing Figure

U.S. Patent  Dec. 31, 1985  4,562,310
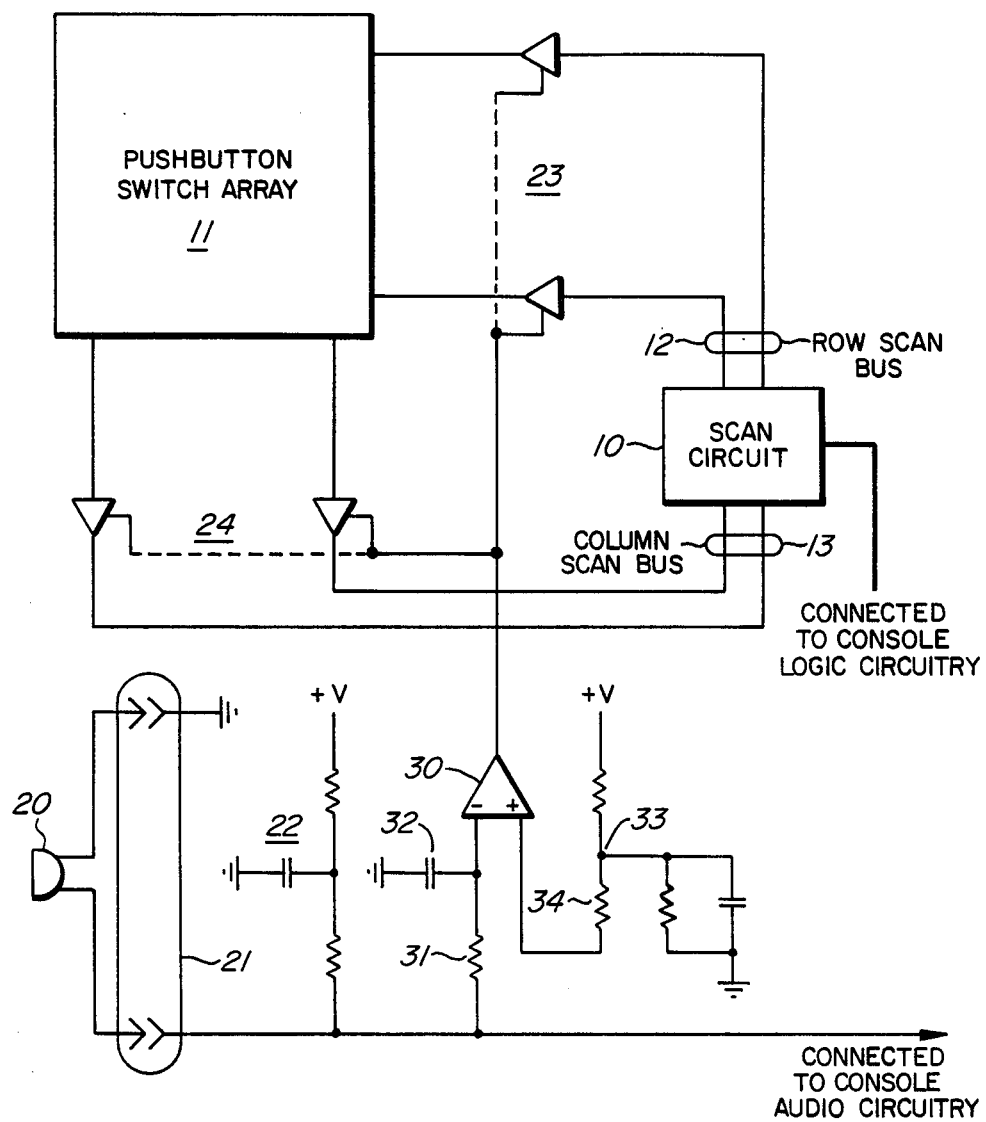

КЕYBOARD SECURITY FOR A TELEPHONE
ATTENDANT CONSOLE

FIELD OF THE INVENTION

The invention is in the field of attendant consoles and more particularly relates to a secure key feature in an attendant console for use with an electronic telephone exchange.

BACKGROUND OF THE INVENTION

In a typical electronic private automatic branch exchange (EPABX) some of the various functions of the exchange are controllable from an attendant console. The typical attendant console includes keys arranged in one or more pushbutton switch arrays and which the attendant uses in the performance of the attendant function. One of these functions is that of designating which of normal or after hours service in which the EPABX is to be operational.

In normal service, telephone calls incoming via a central office trunk are typically received at the attendant console. In after hours service, incoming call occurrences are much less frequent. These calls are usually routed to a station set remote from the attendant position, typically a station set associated with a security staff position.

The designation of after hours service is accomplished by one or more predefined pushbutton switch depressions performed by an attendant, as one of the attendant's last console functions at the close of normal hours. Similarly, the return to normal service is likewise accomplished by predefined pushbutton switch depressions preformed by the attendant at the beginning of normal hours. One benefit of this arrangement is that it is convenient for the attendant to designate the type of service required. However during after hours in some environments, after hours service is sometimes disrupted through pushbutton depression occurrences attributed to unauthorized persons and more frequently to cleaning staff in the normal performance of their function.

One solution to this problem has been to cover the attendant console with a security lid which may even be lockable with the surface upon which the console is supported. This has been very successful in preventing after hours disruptions, however it is also a cumbersome and inconvenient solution.

SUMMARY OF THE INVENTION

In accordance with the invention an attendant console for a telephone system includes a means for removably connecting an attendant headset or handset to the console for use therewith. A switch array provides for indications of attendant control actions at the console. A logic means registers each occurrence of a control action. A gating means is used to inhibit registration of control actions in the absence of a connected attendant headset or handset such that switch operation by unauthorized persons in the absence of the attendant's set is of no consequence to the function of the attendant console.

BRIEF DESCRIPTION OF THE DRAWING

An example embodiment is discussed with reference to a schematic diagram of a portion of a telephone attendant console in accordance with the invention.

DESCRIPTION OF THE EXAMPLE EMBODIMENT

An attendant console as typically required for operation of a EPABX, may be of various designs as is required to be compatible with various exchanges. However such attendant consoles have similar elements, some of which are illustrated in the drawing. With reference to the drawing, these elements usually include a scan circuit 10 being connected to a pushbutton switch array 11 via a plural conductor row scan bus 12 and a plural conductor column scan bus 13. The scan circuit 10 operates in a well known manner to detect pushbutton depressions in the array 11 and to provide indication of same to associated logic circuitry, not shown, in the attendant console. The attendant console also includes audio circuitry, not shown, for transmitting audio signals from an associated microphone 20, which is part of an attendant's handset or headset. The attendant, when at the position of the console, connects the headset or handset, hereafter referred to as the set, to the console via a jack, part of which is shown at 21. Energizing direct current for operation of the microphone 20 is supplied via a resistor network at 22.

In this embodiment, row gate devices at 23 and column gate devices at 24 are connected between the scan circuit 10 and the array 11. Only four of these devices are shown for simplicity of illustration. As many of these devices as there are rows and columns are required. A detector circuit includes a comparator circuit 30 having an output being connected in common to a control input of each of the gate devices at 23 and 24. A resistor 31 is connected between the resistor network 22 and an inverting input of the comparator circuit 30. A capacitor 32 is connected between ground and the junction of the inverting input and the resistor 31. A noninverting input of the comparator circuit 30 is connected to a voltage tap 33 of a voltage divider, as shown, via a resistor 34.

In normal operation with the microphone 20 connected at the jack 21, energizing direct current is supplied from a positive supply +V via the resistor network 22 and the jack 21. Sound waves impinging upon the microphone 20 cause corresponding current variations which are coupled to audio circuitry, now shown, in the console. The voltage divider is so arranged that a potential at the voltage tap 33 is greater than the potential across the microphone 20 thereby causing the output of the comparator circuit 30 to be high. If the set including the microphone 20 is removed, as for example when the attendant leaves the console position, the potential from the resistor network 22 becomes higher than the potential at the voltage tap 33. This causes the output of the comparator circuit 30 to become lower. This in turn causes each of the gates at 23 and 24 to switch from a low impedance to a high impedance. In this case the scan circuit 10 continues a function normally but because of the high impedance of the gates it is no longer able to sense any switch action in the array of pushbutton switches. Hence in the absence of the attendant's set, the attendant console remains in the operating state last designated by the attendant, in spite of key depressions by unauthorized persons, for example cleaning staff or itinerant passers-by.

What is claimed is:

1. An attendant console for a telephone system comprising:

jack means for removably connecting a microphone in an attendant set to the attendant console, a switch array for providing indications of attendant control action at the attendant console, scan means connected to the switch array via row and column scan buses for detecting a control action occurrence, gating means being connected in series with the row and column scan buses, and control means being responsive to connection of the attendant set at the jack means for causing the gating means to pass electrical indication of a control action to the scan means and otherwise for causing the gating means to inhibit said electrical indication.

2. A telephone attendant console comprising:

an array of switches being connected with scan means being associated with logic circuits for registering actuation of the switches;

jack means for detachably connecting a microphone in an attendant set with the attendant console;

a bias circuit including a resistor being connected in series between a voltage supply and the jack means for supplying energizing direct current for operation of the attendant set;

a comparator having a first input connected in common with the jack means and said resistor, and a second input and an output;

a voltage divider having a voltage tap connected to the second input of the comparator for providing a potential thereto, said potential being greater than a d.c. potential at the jack means while the microphone is connected and being less than the d.c. potential at the jack means when the microphone is absent;

the comparator being responsive to the greater and lesser d.c. potentials for providing a logic signal having corresponding signal states at its output;

detecting means being connected to the jack, for generating signal indications corresponding to each of the presence and the absence of the microphone respectively;

gating means being connected between the array of switches and the scan means, the gating means being responsive to the signal indicating the presence of the microphone for passing scan signals between the scan means and the array and being responsive to the signal indicating the absence of the microphone for preventing passage of the scan signals.

3. An attendant console for a telephone system comprising:

jack means for removably connecting a microphone in an attendant set to the attendant console, a switch array for providing indications of attendant control actions at the console, logic means for registering each occurrence of a control action, a resistive current path connected to the jack means for supplying energizing direct current for operation of the microphone, comparator means for generating a logic signal having first and second signal states in response to a voltage at the junction of the resistive current path and the jack means being one of corresponding higher and lower levels, and gate means for inhibiting registration of control action occurrences in response to the logic signal being of the first signal state.

* * * * *